United States Patent
Inukai et al.

(10) Patent No.: US 6,233,432 B1
(45) Date of Patent: *May 15, 2001

(54) PAGER HAVING IMPROVED DISPLAY FOR INFORMATION SERVICE DATA

(75) Inventors: Shinichirou Inukai; Shigeru Uchiyama, both of Yokohama; Toshihiro Hishida, Hyogo, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,470

(22) Filed: Apr. 29, 1998

(30) Foreign Application Priority Data

May 12, 1997 (JP) .................................... 9-120540

(51) Int. Cl.[7] ...................................... H04B 7/00
(52) U.S. Cl. ................ 455/38.4; 455/31.2; 455/566; 340/825.44
(58) Field of Search ........................ 455/38.4, 38.1, 455/158.4, 158.5, 566, 31.1, 31.2; 340/825.69, 825.44, 825.47, 825.5, 825.51, 825.52, 825.53, 825.54, 825.27, 827

(56) References Cited

U.S. PATENT DOCUMENTS

| | | | |
|---|---|---|---|
| 5,012,234 | * 4/1991 | Dulaney et al. | 340/825.44 |
| 5,173,688 | * 12/1992 | DeLuca et al. | 340/825.44 |
| 5,225,826 | * 7/1993 | DeLuca et al. | 340/825.44 |
| 5,254,986 | * 10/1993 | DeLuca | 340/825.44 |
| 5,539,395 | * 7/1996 | Buss et al. | 340/827 |
| 5,600,312 | * 2/1997 | Willard et al. | 340/825.47 |
| 5,705,995 | * 1/1998 | Laflin et al. | 340/825.44 |
| 5,883,580 | * 3/1999 | Briancon et al. | 340/825.44 |
| 6,041,218 | * 3/2000 | Kudoh | 455/38.4 |
| 6,148,178 | * 11/2000 | Nelms et al. | 455/38.4 |

FOREIGN PATENT DOCUMENTS 7-240952  9/1995 (JP) .

* cited by examiner

*Primary Examiner*—Curtis Kuntz
*Assistant Examiner*—Barry W Taylor
(74) *Attorney, Agent, or Firm*—Pearne & Gordon LLP (57) ABSTRACT

A pager includes a control section 103 converts information service data demodulated by a decoder 110 into data to be indicated on a display 101. The control section includes an information service data analysis section 201 which analyzes information service data included in a radio call signal received by broadcast transmission; a receiving area information storage section 205 which stores receiving area information; an information service application storage section 203 which stores an information service application; an information service application selection section 204 which selects the information service application according to receiving area information; and an information service application execution section 202 which executes the thus-selected information service application. Additionally, the selected information service application may be set so as to become specific according to receiving area information.

6 Claims, 7 Drawing Sheets

TOKYO SUNNY CHIBA CLOUDY

KANAGAWA SUNNY SAITAMA CLOUDY

FIG. 7

| TOKYO | SUNNY | CHIBA | CLOUDY |
| KANAGAWA | SUNNY | SAITAMA | CLOUDY |

FIG. 8

TOKYO SUNNY

CHIBA CLOUDY KANAGAWA SUNNY

SAITAMA CLOUDY

FIG. 9

|  | KANAGAWA | SUNNY |  |
|---|---|---|---|
| TOKYO | SUNNY | CHIBA | CLOUDY |
| SAITAMA | CLOUDY |  |  |

FIG. 10

| TOKYO | SUNNY | CHIBA | CLOUDY |
|---|---|---|---|
| KANAGAWA | SUNNY | SAITAMA | CLOUDY |
| GUNMA | RAINY |  |  |

FIG. 11

|  | GUNMA | RAINY |  |
|---|---|---|---|
| TOKYO | SUNNY | CHIBA | CLOUDY |
| KANAGAWA | SUNNY | SAITAMA | CLOUDY |

PAGER HAVING IMPROVED DISPLAY FOR INFORMATION SERVICE DATA

BACKGROUND OF THE INVENTION

The present invention relates to a selective calling/receiving radio device, such as a pager, used for receiving broadcast service information.

A conventional selective calling/receiving radio device (i.e. pager) of this type comprises a radio receiving section, a decoder, a control section, a display, and an operation section. The radio receiving section receives a radio signal, and the decoder reproduces an address signal included in a radio call signal transmitted from a radio calling device. When an identification address determined for a receiving area is verified, the decoder reproduces information service data. The control section converts the information service data into display data, and the display indicates display data. The operation section permits turning on or off of the power supply and switching of data to be displayed. Accordingly, when the identification address determined for the receiving area is verified, the information service data are indicated on the display, However, it is impossible for the pager to select display data in accordance with information service data of a specific receiving area (e.g., a local weather forecast, news, or administrative information), to indicate information in a legible manner, to set options for each receiving area, or to make it possible for the source of information service to change options, by the control section merely converting received broadcast information service data into display data.

SUMMARY OF THE INVENTION

The present invention is intended to solve the foregoing problems in the pager, and the object of the present invention is to provide an improved pager which permits information service data received from a specific receiving area by broadcast transmission to be displayed in a legible manner.

To accomplish the foregoing objects, a pager comprises a control section for converting information service data into display data, the control section comprising a receiving area information storage section for storing receiving area information; an information service application storage section for storing information service application; an information service data analysis section for analyzing information service data; an information service application selection section which selects information service application according to the type of receiving area information and information service data; an information service application setting section for making settings specific to the thus-selected information service application; and an information service application execution section which executes the information service application by means of the analyzed information service data and the information relating to the information service data setting section. With this configuration, the information service data received from a specific receiving area by broadcast transmission can be displayed in a legible manner.

According to the present invention, the pager comprises an information service data analysis section which analyzes information service data included in a radio call signal received by broadcast transmission; a receiving area information storage section which stores receiving area information; an information service application storage section which stores an information service application; an information service application selection section which selects the information service application according to receiving area information; an information service application execution section which executes the thus-selected information service application; and a display section for outputting information service. The device is capable of displaying in a legible manner the information service data which are received from a specific receiving area by broadcast transmission.

Further, the pager of the present invention further comprises an information service application setting section which makes a setting specific to the selected information service application according to the receiving area information.

Furthermore, according to the present invention, the receiving area information storage section can be updated by means of the received information service data.

Moreover, according to the present invention, the information service application setting section can be updated by means of the received information service data.

Still further, according to the present invention, the receiving area information storage section can be updated by means of the received information service data and that the information service application setting section can be updated by means of the received information service data.

DETAILED DESCRIPTION OF THE PREFERRED EMBODIMENTS

First Embodiment

Figure 1:
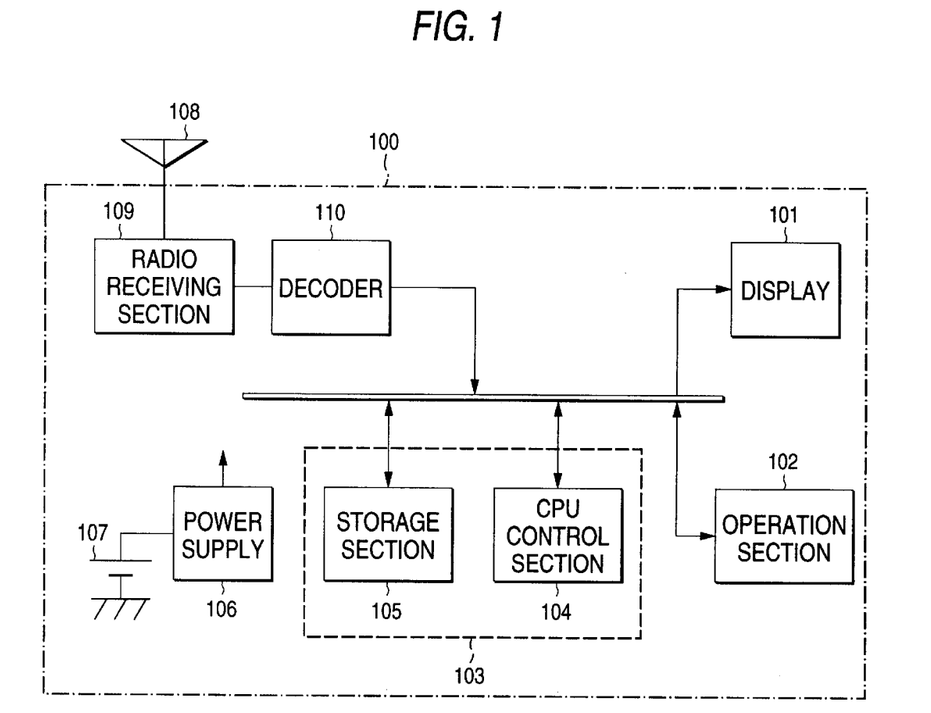
FIG. 1 is a block diagram schematically showing the configuration of a pager according to the present invention.

FIG. 1 shows the configuration of a selective calling/receiving radio device, such as a pager, according to a first embodiment of the present invention. In FIG. 1, reference numeral 100 designates the overall configuration of the pager. Reference numeral 101 designates a display which comprises a liquid crystal display (LCD), a light-emitting diode (LED), and a buzzer (BZ). The display is activated by LCD display data, LED light-emitting data, and BZ beep data. Reference numeral 102 designates an operation section comprises a plurality of key switches (SW), and the operations of the key switches are input to the control section 103. Reference numeral 103 designates a control section which comprises a CPU control section (a microcomputer) 104 and a storage section 105. The CPU control section 104 comprises an arithmetic processing section, a primary storage section (i.e., a register), and input/output drivers and is arranged so as to execute a program instruction from the storage section 105 (e.g., analysis of information service data, selection of information service application, setting of information service application, or execution of the information service application). The storage section 105 comprises a receiving area information storage section, an information service application storage section, and a program instruction storage section. Reference numeral 106 designates a power supply and is arranged to supply operating power to individual sections of the pager 100 from a battery 107. Reference numeral 108 designates an antenna (ANT) which receives a radio call signal from a radio calling device. Reference numeral 109 designates a radio receiving section which demodulates the thus-received radio call signal. Reference numeral 110 designates a decoder which verifies an address signal through use of the demodulated radio call signal and reproduces the information service data.

Figure 2:
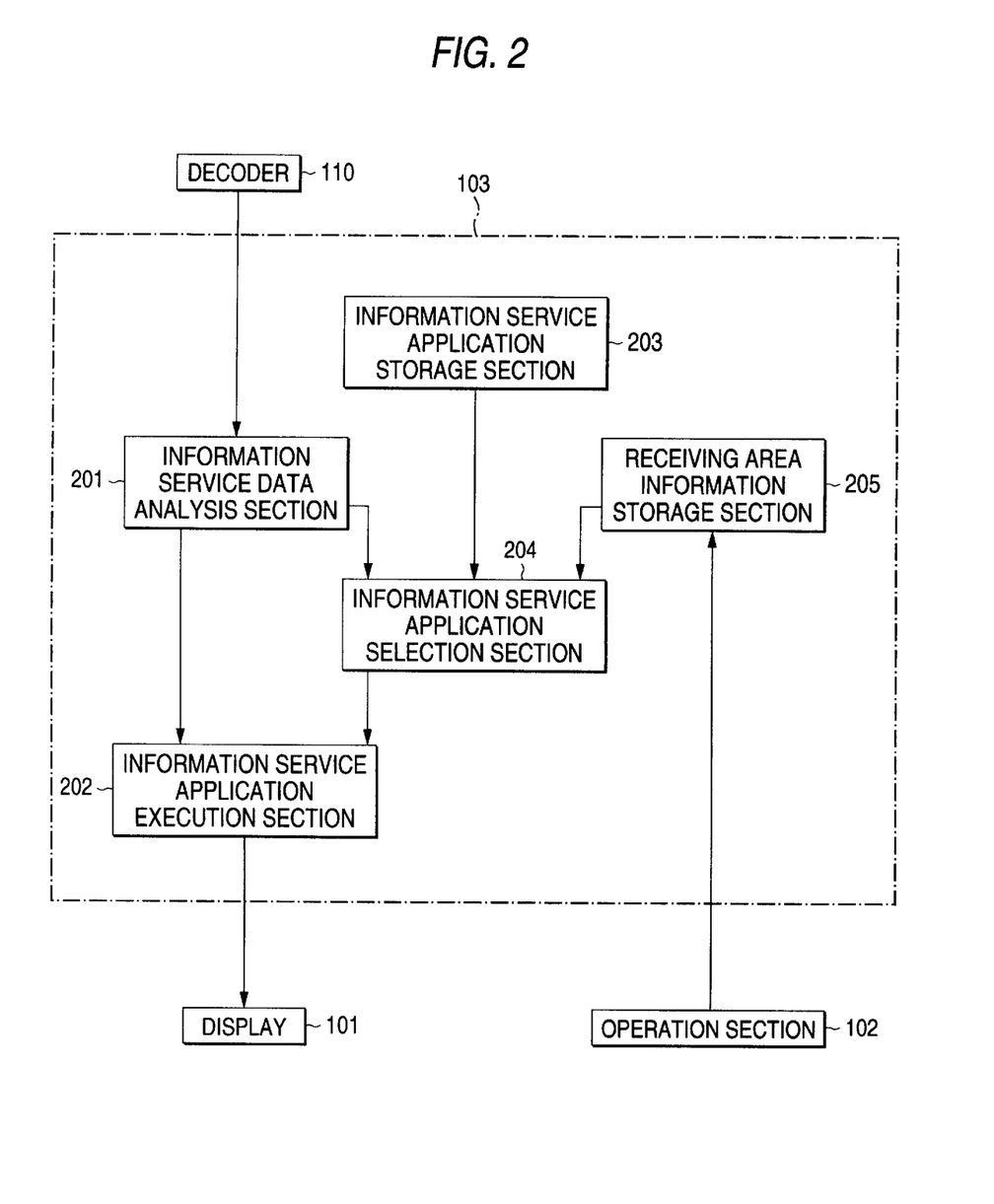
FIG. 2 is a block diagram schematically showing the configuration of a control section according to a first embodiment of the present invention.

The operation of the pager having the foregoing configuration will be described hereinbelow. First, the radio receiving section 109 receives a radio call signal transmitted from the radio calling device. Next, the decoder 110 reproduces an address signal included in the radio call signal. The decoder then verifies an identification address signal defined for a receiving area and receives information service data. As shown in FIG. 2, the control section 103 comprises an information service data analysis section 201 for analyzing information service data, an information service application execution section 202 which executes information service application on the basis of the thus-analyzed information service data and information relating to an information service application selection section; an information service application storage section 203 which stores information service application; an information service application selection section 204 which selects information service application according to the type of receiving area information and the analyzed information service data; and a receiving area information storage section 205 for storing the receiving area information. The control section prepares display data and transfers the thus-prepared display data to the display 101, where the display data received from the control section 103 are displayed. The operation section 102 switches a display data set which shows the turning on or off of the power supply 106.

Next, the operation of the control section 103 will be described by reference to FIG. 2. First, the information service data analysis section 201 receives information service data from the decoder 110 and analyzes the thus-received information service data. The information service data analysis section transfers information relating to the type of the information service application to the information service application selection section 204. Further, display data are transferred to the information service application execution section 202. The information service application storage section 203 stores a required number of execution procedures relating to the layout of indication of information service data, the illumination of the LED, and sounding of the buzzer, all of which are distinguished from one another according to the type of the information service application. Similarly, the receiving area information storage section 205 stores a required number of receiving area data sets used for receiving service information. The receiving area information can be changed by way of the operation section 102. The information service application selection section 204 receives the type of information service application from the information service application analysis section 201; receives the receiving area information from the receiving area information storage section 205; selects an information service application suitable for the type of the receiving area information and the information service application from the information service application storage section 203; and transfers the thus-selected information service application to the information service application execution section 202. The information service application execution section 202 receives the display data from the information service data analysis section 201; receives the information service application from the information service application selection section 204; and executes preparation of the display data. The display 101 receives the thus-prepared display data from the information service application execution section 202; displays the information service on the LCD according to the display data; illuminates the LED; and sounds the buzzer BZ.

Second Embodiment

Figure 3:
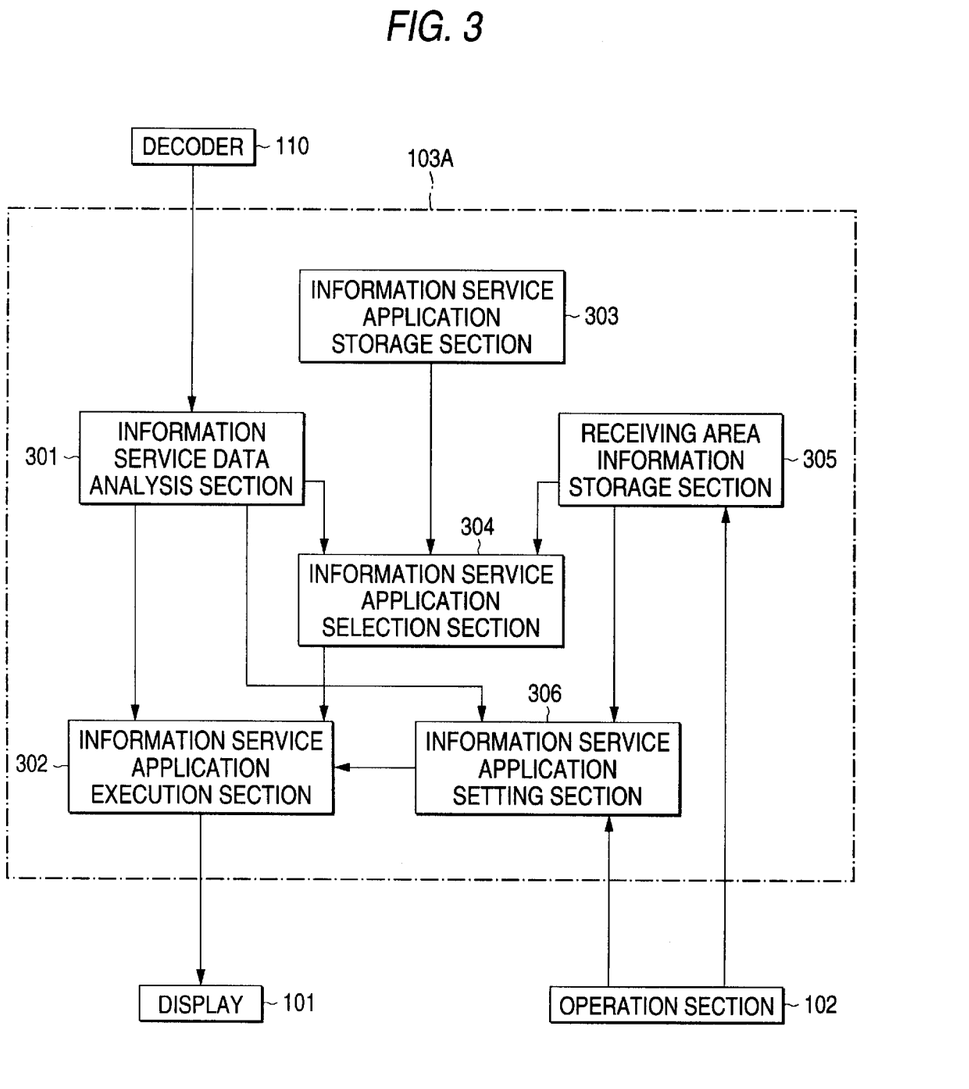
FIG. 3 is a block diagram schematically showing the configuration of a control section according to a second embodiment of the present invention.

FIG. 3 shows the configuration of a control section 103A according to a second embodiment of the present invention. The control section is different from that shown in FIG. 2 only in that the control section shown in FIG. 3 is provided with an information service application setting section 306. The operation of the control section 103A will now be explained by reference to FIG. 3. First, an information service data analysis section 301 analyzes the information service data received from the decoder 110; transfers information relating to the type of the information service application to an information service application selection section 304; transfers information relating to the settings of the information service application to an information service application setting section 306; and transfers the display data to an information service application execution section 302.

An information service application storage section 303 stores a required number of execution procedures relating to the layout of indication of information service data, the illumination of the LED, and sounding of the buzzer, all of which are distinguished from one another according to the type of the information service application. Similarly, the receiving area information storage section 305 stores a required number of receiving area data sets used for receiving service information. The receiving area information can be changed by way of the operation section 102. The information service application setting section 306 receives information relating to settings of the information service application from the information service data analysis section 301; receives the receiving area information from the receiving area information storage section 305; and transfers the setting information to the information service application execution section 302. The information relating to the settings of the information service application can also be changed by way of the operation section 102.

The information service application selection section 304 receives the information relating to the type of information service application from the information service application analysis section 301; receives the receiving area information from the receiving area information storage section 305; selects an information service application suitable for the type of the receiving area information and the information service application from the information service application storage section 303; and transfers the thus-selected information service application to the information service application execution section 302. The information service application execution section 302 receives the display data from the information service data analysis section 301; receives the information service application from the information service application selection section 304; receives setting information from the information service application setting section 306; and executes preparation of the display data. The display 101 receives the thus-prepared display data from the information service application execution section 302; displays the information service on the LCD according to the display data; illuminates the LED; and sounds the buzzer BZ.

Third Embodiment

Figure 4:
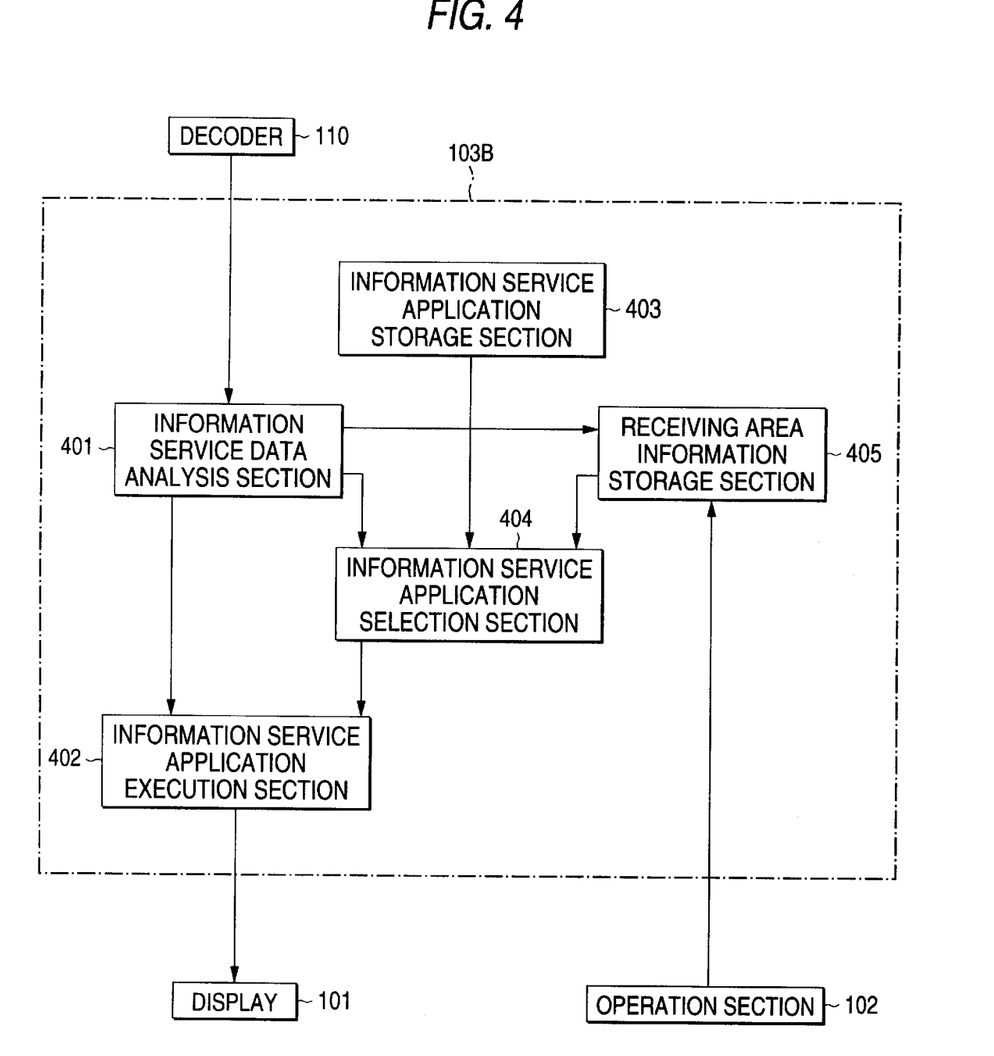
FIG. 4 is a block diagram schematically showing the configuration of a control section according to a third embodiment of the present invention.

FIG. 4 shows the configuration of a control section 103B according to a third embodiment of the present invention. The control section is different from that shown in FIG. 2 in that the receiving area analyzed by an information service data analysis section 401 is transferred to a receiving area information storage section 405. The operation of the control section 103B will now be explained by reference to FIG. 4. First, the information service data analysis section 401 analyzes information service data received from the decoder 110; transfers information relating to the type of the information service application to an information service application selection section 404; transfers new receiving area information to the receiving area information storage section 405; and transfers display data to an information service application execution section 402.

An information service application storage section 403 stores a required number of execution procedures relating to the layout of indication of information service data, the illumination of the LED, and sounding of the buzzer, all of which are distinguished from one another according to the type of the information service application. Similarly, the receiving area information storage section 405 stores a required number of receiving area data sets used for receiving service information and stores new receiving area information received from the information service application analysis section 401. The receiving area information can be changed by way of the operation section 102.

The information service application selection section 404 receives the information relating to the type of information service application from the information service application analysis section 401; receives new receiving area information from the receiving area information storage section 405; selects an information service application suitable for the type of the receiving area information and the information service application from the information service application storage section 403; and transfers the thus-selected information service application to the information service application execution section 402. The information service application execution section 402 receives the display data from the information service data analysis section 401; receives the information service application from the information service application selection section 404; and executes preparation of the display data. The display 101 receives the edited display data from the information service application execution section 402; displays the information service on the LCD according to the display data; illuminates the LED; and sounds the buzzer BZ.

Fourth Embodiment

Figure 5:
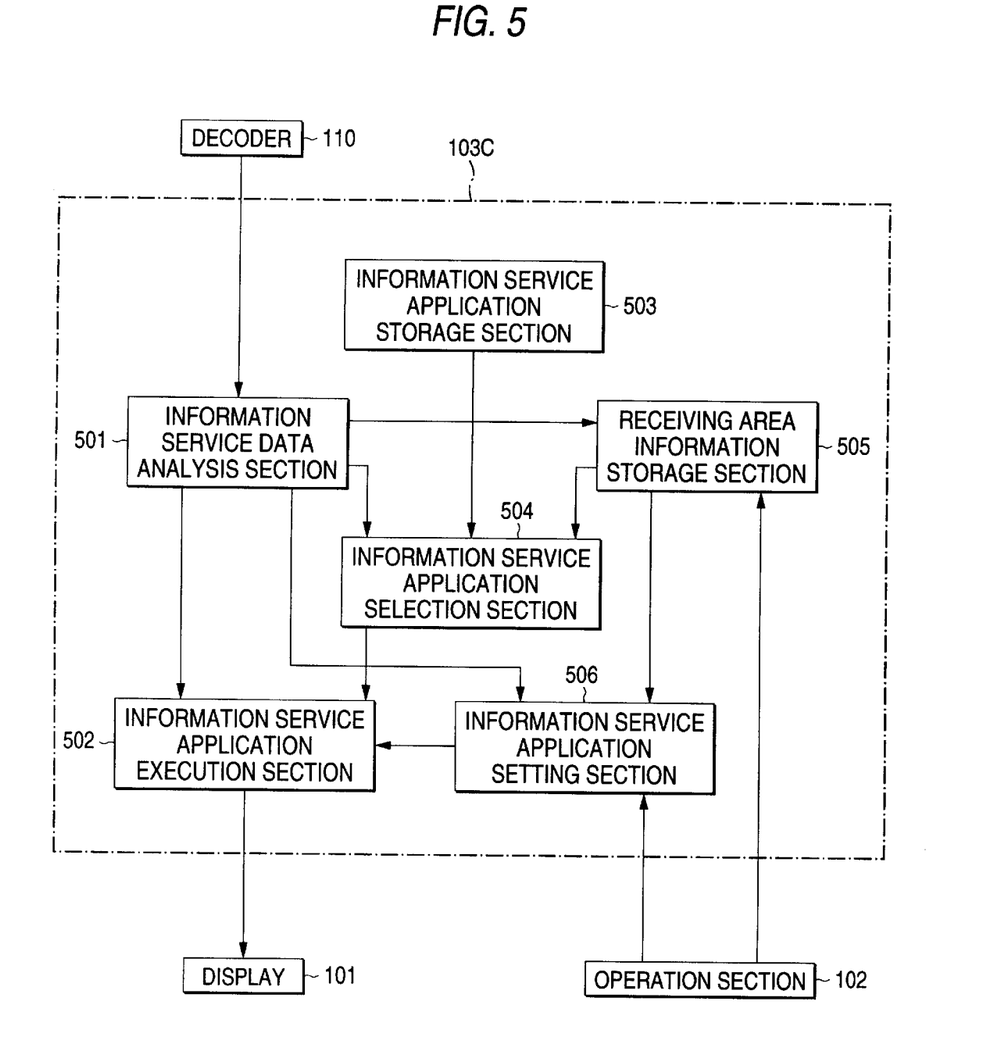
FIG. 5 is a block diagram schematically showing the configuration of a control section according to a fourth embodiment of the present invention.

FIG. 5 shows the configuration of a control section 103C according to a fourth embodiment of the present invention. The control section is different from that shown in FIG. 3 in that the receiving area analyzed by an information service data analysis section 501 is transferred to a receiving area information storage section 505. The operation of the control section 103C will now be explained by reference to FIG. 5. First, the information service data analysis section 501 analyzes information service data received from the decoder 110; transfers information relating to the type of the information service application to an information service application selection section 504; transfers new receiving area information to the receiving area information storage section 505; transfers information relating to the settings of the information service application to an information service application setting section 506; and transfers display data to an information service application execution section 502.

An information service application storage section 503 stores a required number of execution procedures relating to the layout of indication of information service data, the illumination of the LED, and sounding of the buzzer, all of which are distinguished from one another according to the type of the information service application. Similarly, the receiving area information storage section 505 stores a required number of receiving area data sets used for receiving service information and stores new receiving area information received from the information service application analysis section 501. The receiving area information can be changed by way of the operation section 102. The information service application setting section 506 receives information relating to settings of the information service application from the information service data analysis section 501; receives new receiving area information from the receiving area information storage section 505; and transfers the setting information to the information service application execution section 502. The information relating to the settings of the information service application can also be changed by way of the operation section 102.

The information service application selection section 504 receives the information relating to the type of information service application from the information service application analysis section 501; receives new receiving area information from the receiving area information storage section 505; selects an information service application suitable for the type of the receiving area information and the information service application from the information service application storage section 503; and transfers the thus-selected information service application to the information service application execution section 502. The information service application execution section 502 receives the display data from the information service data analysis section 501; receives the information service application from the information service application selection section 504; and executes preparation of the display data. The display 101 receives the thus-prepared display data from the information service application execution section 502; displays the information service on the LCD according to the display data; illuminates the LED; and sounds the buzzer BZ.

Examples of Displays used in the Embodiments

Next, display data according to the present invention are exemplarily shown on the LCD screen. An explanation will be given, taking weather forecasts for a plurality of areas as broadcast data relating to an information service application.

Figure 6:
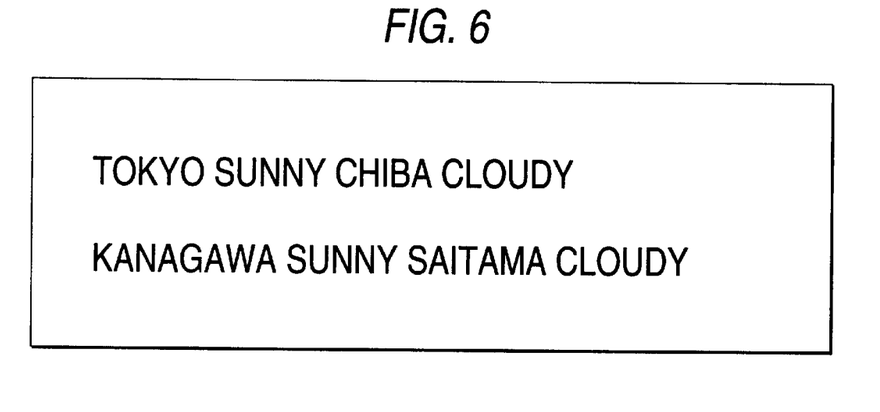
FIG. 6 is a chart showing an indication displayed on an LCD by a conventional pager.

FIG. 6 shows an example of information service data received by the conventional pager. In this example, the received information is displayed, exactly as is. Hence, the user must carefully read the information.

Figure 7:
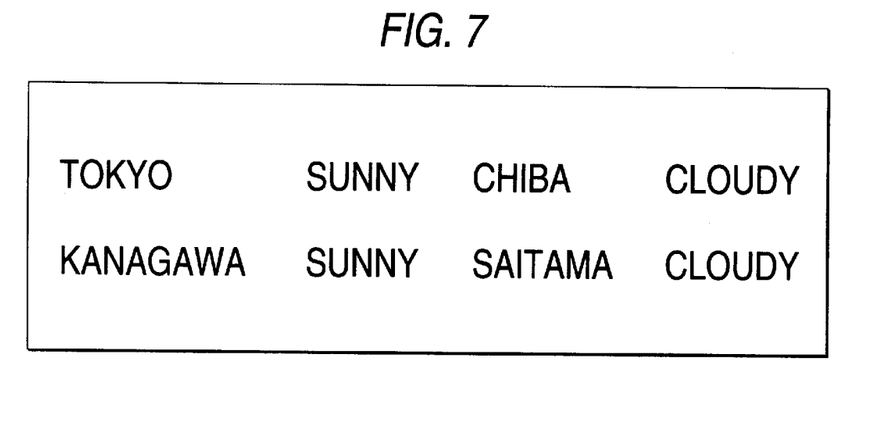
FIG. 7 is a chart showing an indication displayed on the LCD by the device according to the first embodiment.

FIG. 7 shows an example of the information displayed by the device according to the first embodiment shown in FIG. 2. By virtue of the operation of the information service application execution section 202, the information is arranged so as to provide legible area-to-area display layouts.

Figure 8:
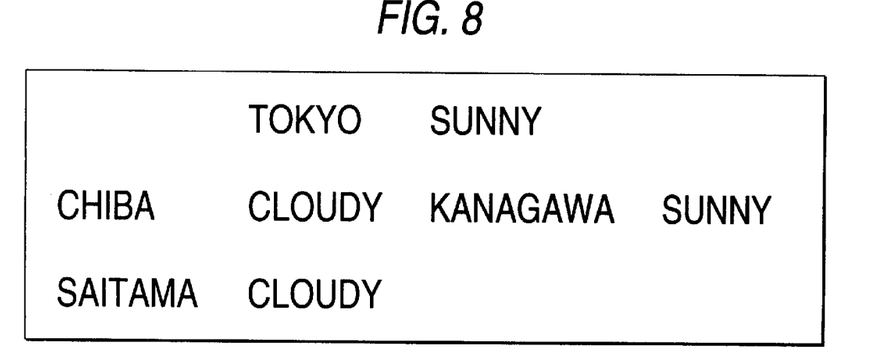
FIG. 8 is a chart showing a first indication displayed on the LCD by the device according to the second embodiment.

FIG. 8 shows an example of the information displayed by the device according to the second embodiment shown in FIG. 3. In this example, the information service data received by broadcast transmission is not changed. By virtue of the operation of the information service application setting section 306 [i.e., among information pieces received from an information-providing area (e.g., Tokyo), the information piece relevant to the information-providing area (i.e., Tokyo) is displayed in the top row], enabling the user to more readily read a weather forecast for the information-providing area.

Figure 9:
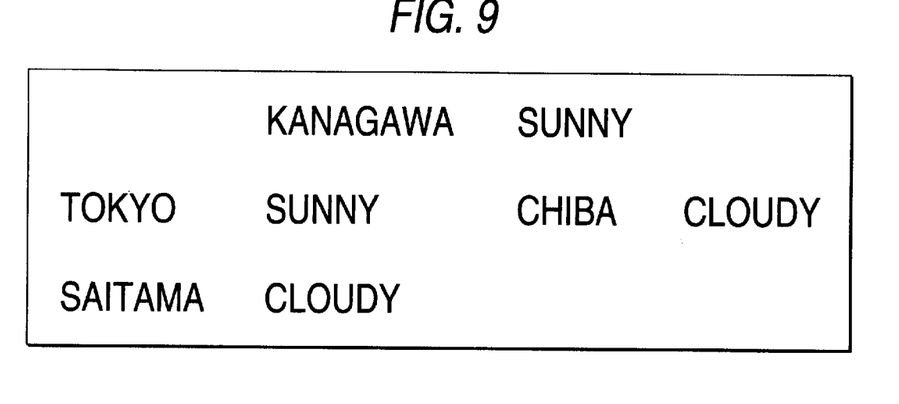
FIG. 9 is a chart showing a second indication displayed on the LCD by the device according to the second embodiment.

FIG. 9 is another example of the information displayed by the device according to the second embodiment shown in FIG. 3. This examples relates to an indication of area information provided by Kangawa Prefecture. The device has the advantage that the information providers (which provide the information shown in FIGS. 8 and 9) can provide information in a legible form for each receiving area through use of the common information service data.

Figure 10:
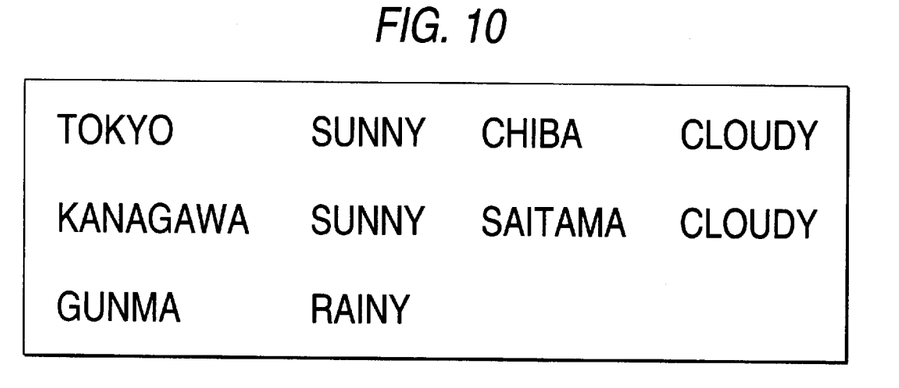
FIG. 10 is a chart showing an indication displayed on the LCD by the device according to the third embodiment.

FIG. 10 shows an example of the information displayed by the device according to the third embodiment shown in FIG. 4. In this example, the broadcast information service data are not changed, and the receiving area information stored in the receiving area information storage section 405 is updated (e.g., Gunma Prefecture is newly added to the storage section as receiving area information).

Figure 11:
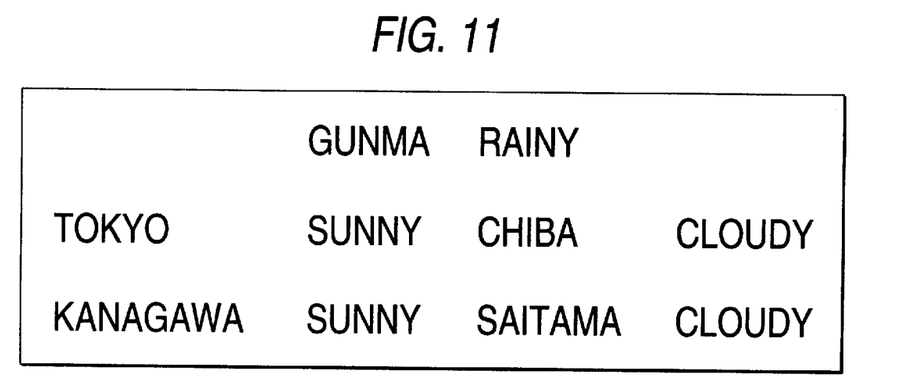
FIG. 11 is a chart showing an indication displayed on the LCD by the device according to the fourth embodiment.

FIG. 11 is an example of the information displayed by the device according to the third embodiment shown in FIG. 5. In addition to the operation described for the example shown in FIG. 10, by virtue of the operation of the information service application setting section 506 [e.g., among the information pieces (received from Gunma Prefecture), the information piece relevant to the area where the information is provided (i.e., Gunma Prefecture) is displayed on the top row, thereby rendering the weather forecast for the information-providing area (Gunma Prefecture) more legible.

As is evident from the descriptions of the previous embodiments, the present invention yields the following advantageous results:

The information service application analysis section is capable of analyzing the information service data; determining the type of an information service application (i.e., information used for selecting an information service application); adding new receiving area information to a receiving area information storage section (i.e., addition of selection of a new information service application); determining information relating to the settings of the information service application (i.e., setting of details for execution of the selected information service application); and preparing display data.

Since the receiving area information storage section stores receiving area information, an information service application can be selected for each receiving area.

Since the information service application storage section stores a required number of information service applications (e.g., execution procedures relating to a display layout of information service data, illumination of an LED, or sounding of a beep) which are distinguished from one another according to the type of an information service application, selection of an application is feasible.

The information service application selection section is capable of receiving information relating to the type of an information service application from the information service application analysis section; receiving receiving area information from the receiving area information storage section; and selecting an information service application suitable for the type of receiving area information and the information service application.

The information service application setting section is capable of receiving information relating to the setting of the information service application from the information service data analysis section; receiving receiving area information from the receiving area information storage section; and preparing setting information (changing part of operation of the received information service application).

The information service application execution section is capable of receiving display data from the information service data analysis section; receiving an information service application from the information service application selection section; setting information from the information service application setting section; and preparing display data.

The display is capable of receiving the thus-prepared display data from the information service application execution section; displaying the information service on an LCD according to the display data; illuminating an LED; and sounding a buzzer BZ.

What is claimed is:

1. A pager for displaying received information in an organized and readily readable format, comprising:

an information service data analysis section that analyzes information service data included in a radio call signal received by broadcast transmission;

a receiving area information storage section that stores receiving area information;

an information service application storage section that stores a plurality of information service applications;

an information service application selection section that selects one of the information service applications from the information service application storage section according to the receiving area information obtained from the receiving area information storage section and the type of information service data received from the information service data analysis section;

an information service application execution section that executes the information service application selected by the information service application selection section and prepares display data from data received from the information service data analysis section formatted according to the executed information service application; and a display section that receives the prepared display data from the information service application execution section and displays the prepared display data.

2. The pager as claimed in claim 1, wherein the receiving area information storage section is updated by means of the received information service data obtained from the information service data analysis section.

3. A pager for displaying received information in an organized and readily readable format, comprising:

an information service data analysis section that analyzes information service data included in a radio call signal received by broadcast transmission;

a receiving area information storage section that stores receiving area information;

an information service application storage section that stores a Plurality of information service applications;

an information service application selection section that selects one of the information service applications from the information service application storage section according to the receiving area information obtained from the receiving area information storage section and the type of information service data received from the information service data analysis section;

an information service application execution section that executes the information service application selected by the information service application selection section and prepares display data from data received from the information service data analysis section formatted according to the executed information service application;

a display section that receives the prepared display data from the information service application execution section and displays the prepared display data; and, an information service application setting section that provides a setting to the information service application execution section according to receiving area information received from the receiving area information storage section so that information pertinent to the receiving area is relatively more prominently displayed.

4. The pager as claimed in claim 3, wherein the receiving area information storage section is updated by means of the received information service data obtained from the information service data analysis section.

5. The pager as claimed in claim 3, wherein the information service application setting section is updated by means of the received information service data obtained from the information service data analysis section.

6. The pager as claimed in claim 3 wherein the receiving area information storage section is updated by means of the received information service data obtained from the information service data analysis section; and the information service application setting section is updated by means of the received information service data obtained from the information service data analysis section.

* * * * *

UNITED STATES PATENT AND TRADEMARK OFFICE
CERTIFICATE OF CORRECTION

PATENT NO. : 6,233,432 B1
DATED : May 15, 2001
INVENTOR(S) : Inukai et al.

It is certified that error appears in the above-identified patent and that said Letters Patent is hereby corrected as shown below:

Column 1,
Line 23, delete "," (comma) and insert -- . -- (period).

Column 2,
Line 22, delete "and that the information service application setting section can be updated by means of the received information service data."

Signed and Sealed this

Twenty-sixth Day of February, 2002

Attest:

Attesting Officer

JAMES E. ROGAN
Director of the United States Patent and Trademark Office